United States Patent [19]

Takeshita et al.

[11] Patent Number: 5,141,801

[45] Date of Patent: Aug. 25, 1992

[54] COEXTRUDED POLYOLEFIN FILMS HAVING IMPROVED BARRIER PROPERTIES

[75] Inventors: Kenneth Takeshita, Alameda, Calif.; Attila Matray, Loveland, both of Ohio

[73] Assignee: James River II, Inc., Milford, Ohio

[21] Appl. No.: 431,606

[22] Filed: Nov. 3, 1989

Related U.S. Application Data

[63] Continuation-in-part of Ser. No. 188,923, May 2, 1988, abandoned.

[51] Int. Cl.⁵ .......................... B32B 7/12; B32B 15/04
[52] U.S. Cl. .................. 428/348; 428/476.1; 428/484; 428/523; 428/516
[58] Field of Search ...................... 428/484, 348, 476.1, 428/523

[56] References Cited

U.S. PATENT DOCUMENTS

| | | | |
|---|---|---|---|
| 3,182,033 | 5/1965 | Gregorian | 260/28.5 |
| 3,447,883 | 6/1969 | Boyer et al. | 8/4 |
| 3,536,644 | 10/1970 | Frizelle et al. | 260/28.5 |
| 4,442,243 | 4/1984 | Woodhams | 523/212 |
| 4,612,221 | 9/1986 | Biel et al. | 428/476.1 X |
| 4,767,651 | 8/1988 | Starczewski et al. | 428/476.1 X |

OTHER PUBLICATIONS

"Plastic Films and Packaging"; C. R. Oswin; Halsted Press; 1975; pp. 5, 26, 124, and 138 plus 42-43.

*Primary Examiner*—George F. Lesmes
*Assistant Examiner*—Terrel Morris
*Attorney, Agent, or Firm*—Stanley M. Teigland

[57] ABSTRACT

The barrier properties of a coextruded film having a surface layer comprising a crystalline polyolefin can be improved substantially by incorporating a precise amount of a partially incompatible wax into the polyolefin. The film has an interior layer comprising a polymer that prevents migration of the wax to the other surface of the film so that wax does not interfere with the printability or heat sealability of the other surface. The wax-containing polyolefin layer also protects the interior layer from adverse effects of moisture, such as when the interior layer comprises EVOH. An interior layer of EVOH may be sandwiched between wax-containing polyolefin layers to fully protect it from moisture.

10 Claims, 2 Drawing Sheets

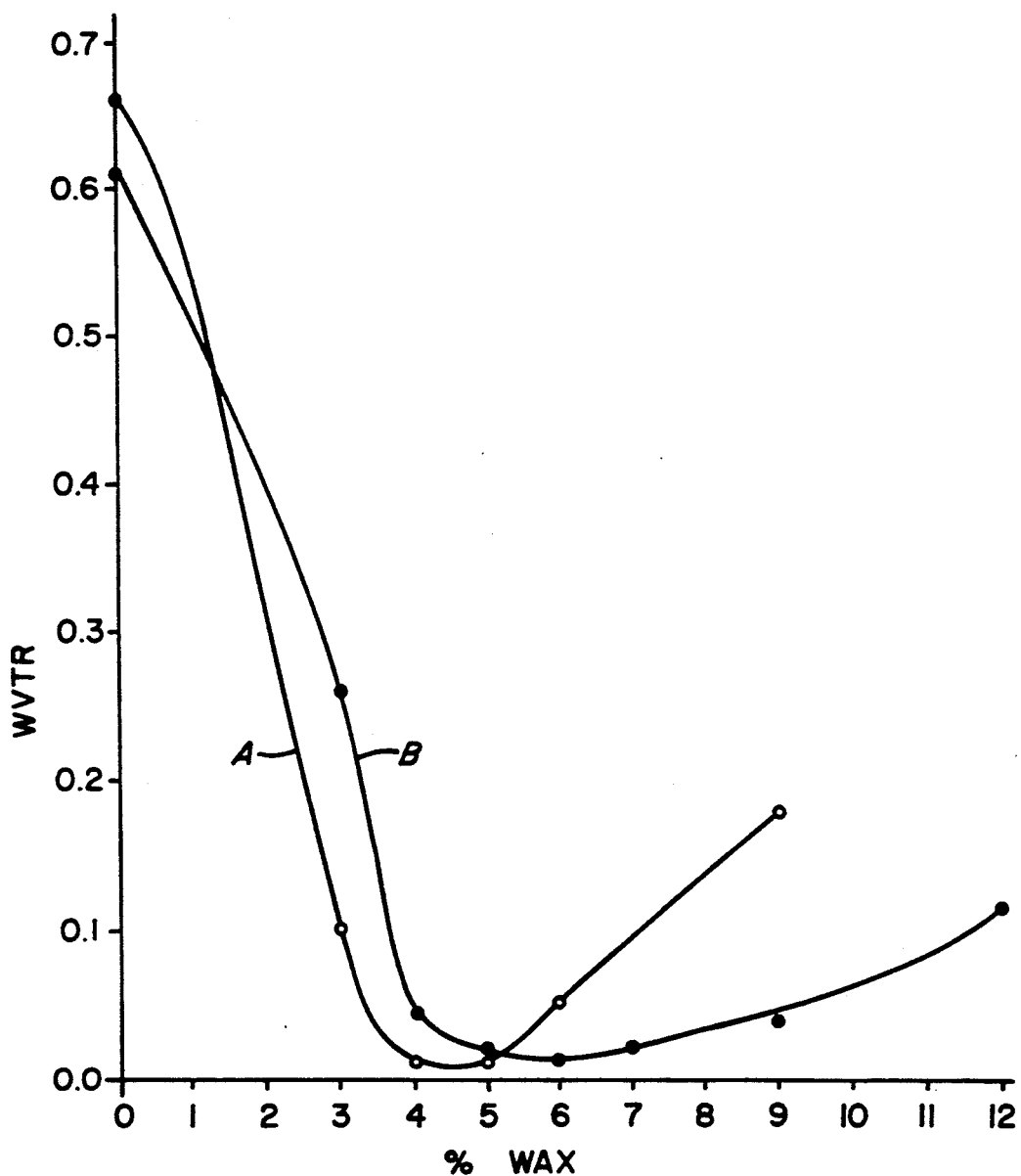
FIG._1.

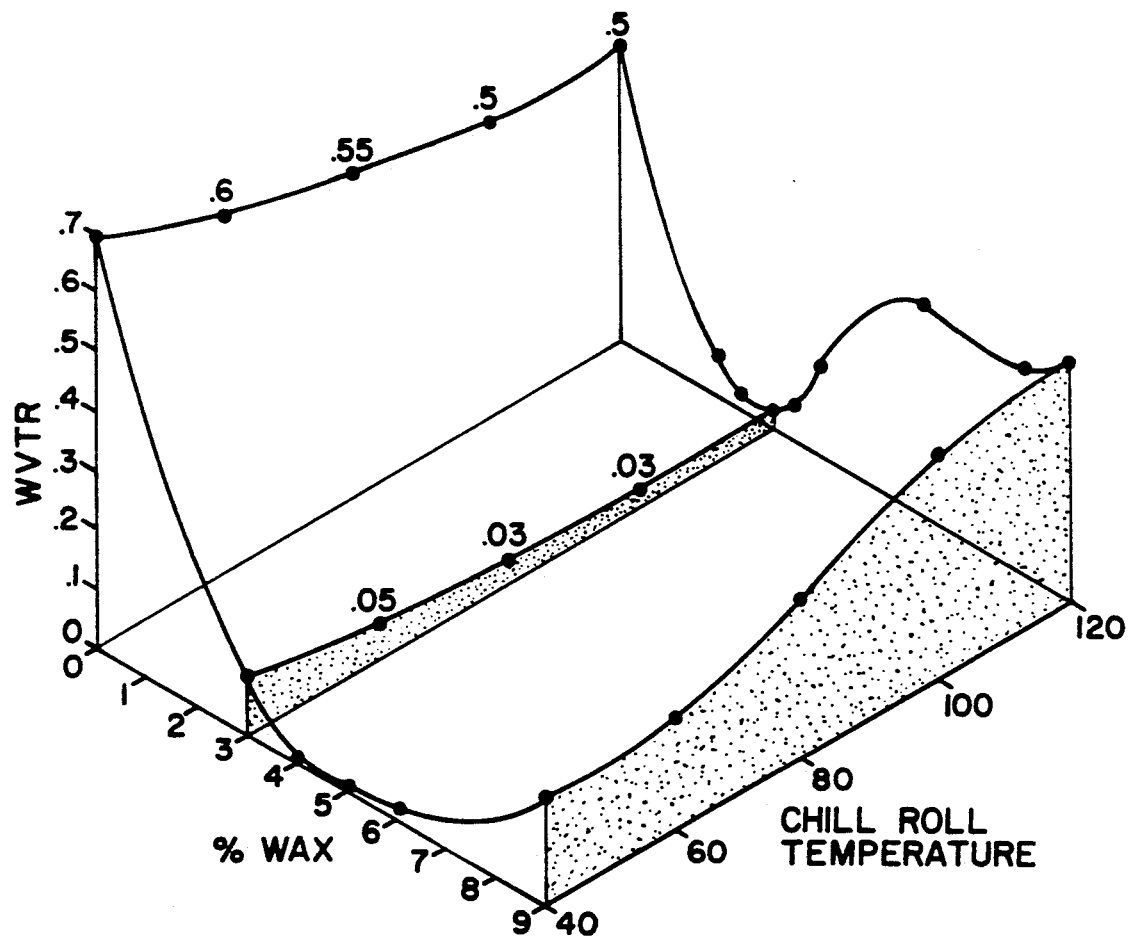
FIG._2.

COEXTRUDED POLYOLEFIN FILMS HAVING IMPROVED BARRIER PROPERTIES

This is a continuation in part of Ser. No. 07/188,923 filed May 2, 1988, now abandoned.

This invention relates to coextruded plastic films having a layer comprising a polyolefin. An important property of such films when they are used to package certain articles, especially food, is the ability of the film to act as a barrier to moisture, oxygen and aroma. This invention provides coextruded films having improved barrier properties.

In accordance with this invention, the barrier properties of a coextruded plastic film having a layer comprising a crystalline polyolefin are substantially improved by adding to the polyolefin a certain amount of wax. The amount of wax added depends on the type of polyolefin and the rate at which the film is cooled but generally the amount is between about two and twelve percent, preferably between about three and ten percent by weight based on the weight of the polyolefin. When the water vapor transmission rate WVTR of the film is plotted against the concentration of wax in this range, the graph forms a concave curve having a low point or nadir in the range. Within the range the wax reduces the water vapor transmission rate of the polyolefin layer at least four fold, preferably at least ten fold, and at or near the low point, at least twenty fold. Referring to the wax concentration at the low point of WVTR as $C_L$, the wax concentration preferably ranges from $C_L$ minus 3 to $C_L$ plus 3, more preferably from $C_L$ minus 2 to $C_L$ plus 2. The WVTR of the polyolefin layer is preferably less than 0.2, more preferably less than 0.1, and most preferably less than 0.05 grams/100 square inches/24 hours/mil.

BRIEF DESCRIPTION OF THE DRAWINGS

FIG. 1 is a graph showing the relationship between water vapor transmission rate and the concentration of paraffin wax in propylene homopolymer film (curve A) and ethylene-propylene copolymer film (curve B).

FIG. 2 is a graph showing the relationship between water vapor transmission rate, chill roll temperature in degrees Fahrenheit, and the concentration of paraffin wax in polypropylene film.

Crystalline polyolefins include polyethylene, isotactic polypropylene, polybutylene, poly-4-methylpentene-1, copolymers of propylene with up to 7 percent ethylene by weight, copolymers of butylene with up to 5 percent ethylene by weight, and copolymers of propylene and butylene. The degree of crystallinity of the polyolefin is preferably greater than about 25 percent, more preferably greater than about 30 percent. Polyolefins that are not crystalline include atactic polypropylene, polyisobutylene, ethylene-propylene copolymer rubbers, and copolymers of an olefin with a polar monomer, such as ethylene-vinyl acetate copolymer.

Even the most crystalline polyolefins have some amorphous regions. In the practice of this invention, it is believed that the wax is incompatible with the crystalline regions of the polyolefin and has limited compatibility with the amorphous regions. It is further believed that the wax crystallizes in the amorphous regions of the polyolefin, and that this phenomenon explains the significant improvement in barrier properties.

The wax is preferably a hydrocarbon wax, which may be either a mineral wax or a synthetic wax. The type of wax depends on the type of polyolefin. When the polyolefin is polyethylene, the preferred wax is synthetic polypropylene wax, with polyethylene type waxes being unsuitable because they are compatible with crystalline polyethylene. When the polyolefin is a poly-alpha-olefin, the preferred wax is a polyethylene type wax, with synthetic polypropylene waxes being unsuitable because they are compatible with poly-alpha-olefins.

The polyethylene type wax preferably has an average chain length between about 22 and 65 carbon atoms, a molecular weight between about 300 and 800, and a melting point between about 125 and 190° (52° and 88° C.). These waxes include paraffin waxes, microcrystalline waxes, and intermediate waxes. Most preferred are paraffin waxes, which typically have an average chain length between about 22 and 40 carbon atoms, a molecular weight between about 300 and 450, and a melting point between about 125° and 160° F. (52° and 71° C.). The paraffin wax preferably consists of a mixture of normal and branched chain paraffins, with the normal paraffin content preferably being from about 35 to 90 percent by weight The paraffin wax preferably has a broad molecular weight distribution. For example, each fraction of chains containing a certain number of carbon atoms preferably represents less than 25 percent, more preferably less than 20 percent, of the wax. A paraffin wax having a broad molecular weight distribution provides better barrier properties than a paraffin wax having a narrow molecular weight distribution, which is believed to be due to the formation by the wax having the broad molecular weight distribution of crystallites that have a morphology that conforms better with the morphology of the amorphous regions of the polyolefin. Best results have been observed with a paraffin wax available commercially under the designation Chevron 143. It has a melting point of about 143° F. (62° C.), an average chain length of 29 carbon atoms, an average molecular weight of about 417, a normal paraffin content of about 75 percent, and contains about 12 percent $C_{28}$ fraction, 12 percent $C_{29}$ fraction, and 11 percent $C_{30}$ fraction (the three largest fractions in the wax).

The amount of wax depends on the amorphousness of the polyolefin, which in turn depends on the type of polyolefin, the method of cooling the extruded film containing the polyolefin, and the thickness of the film. When the film is a single layer film of propylene homopolymer having a thickness between about one and two mils, and the film is cast extruded onto a chill roll having a temperature of about 4° C. (39° F.), maximum improvement in moisture barrier is obtained when the polypropylene contains between about four and five percent wax, as shown by curve A in FIG. 1. When this amount of wax is exceeded, the excess wax adversely affects the moisture barrier property, which is believed to be due to the wax exceeding its limit of compatibility with the amorphous region of the polypropylene. When the polyolefin is a copolymer of propylene and about five percent ethylene, and the film is extruded under the same conditions, maximum improvement in moisture barrier is obtained when the amount of wax is about six percent, as shown by curve B in FIG. 1. Slightly more wax is required because the copolymer is more amorphous than the homopolymer. However, the copolymer is able to contain excess wax without as much adverse effect on moisture barrier, which is believed to be due to the ability of the amorphous region to absorb more of the excess wax.

The temperature of the chill roll affects the extent of the amorphous region of the polyolefin, especially near the surface of the film contacting the chill roll. Decreasing the temperature of the chill roll has the effect of increasing the extent of the amorphous region, with the result that slightly more wax is required to achieve maximum improvement in moisture barrier, but excess wax has less adverse effect on moisture barrier, as shown in FIG. 2. Hence, in practicing this invention on a large scale, it is desirable to cool the extruded film in order to broaden the tolerance specifications for the concentration of wax in the polyolefin. The film may be cooled by contacting it with a cooling medium. For cast film the cooling medium is normally a chill roll. For blown film, the cooling medium may be a fluid, such as water or forced air. Forced air may also be used on the other surface of cast film. The temperature of the cooling medium is preferably between about 0° and 25° C. (32° and 77° F.).

For conventional crystalline polyolefin films containing no wax, decreasing the temperature of the chill roll has the effect of making the moisture barrier worse, which is the opposite of the effect observed for most of the range of wax concentration within the scope of this invention.

The film of this invention may be annealed to improve the barrier properties of the film. The film may be annealed by heating it to an elevated temperature, preferably ranging from the melting point of the wax to a temperature about twenty degrees Celsius (20° C.) less than the softening point of the polyolefin, and then rapidly cooling the film, such as by quenching the film in water.

When the proper amount of wax is added to the polyolefin, it has a very slight effect on the clarity of the polyolefin layer. For example, when film of the ethylene-propylene copolymer referred to in FIG. 1 contains six percent paraffin wax, it has a haze value, measured in accordance with ASTM-D1003-82, of 14 compared to a haze value of 8 for the corresponding film containing no wax. However, when the wax concentration is increased to nine percent and twelve percent, the haze value is increased to 55 and 88, respectively, by the excess wax. The effect of the excess wax on the clarity of the film can be mitigated by annealing the film. For example, when the films containing the excess wax are heated to 200° F. (93° C.) and then quenched, the haze values are reduced to 13.5 and 18.5, respectively. The annealing also improves the WVTR of the films.

The adverse effect of excess wax can also be mitigated by adding to the polyolefin a minor amount, preferably less than twenty percent, more preferably less than twelve percent, of an amorphous polymer compatible with the wax. The amorphous polymer preferably has limited compatibility with the polyolefin.

As the extruded film cools, the interior of the polyolefin layer crystallizes, leaving an amorphous region near each surface of the layer, which is where the wax is believed to migrate. However, the effect of the wax is not a surface effect because no wax is observed on the surface when the proper amount of wax is employed, and the moisture barrier of the film is not adversely affected by creasing the film. On the other hand, because the wax is concentrated near the surface, with the interior of the polyolefin layer being more crystalline because of its slower rate of cooling, increasing the thickness of the polyolefin layer does not require a corresponding increase in the amount of wax added to the polyolefin.

Although the wax tends to concentrate near the surface of the polyolefin layer, the film is preferably prepared by extruding a blend of the polyolefin and substantially all of the wax as an interior layer in a coextruded film. This method of preparing the film avoids the problem of plate-out of the wax on the chill roll. In order to equalize the viscosities of the layers, the polyolefin in the interior layer preferably has a lower melt index, before the wax is added to it, than the polymers in the other layers. Although the wax is in the interior layer initially, it migrates into adjacent polyolefin layers as the interior layer crystallizes. Hence, as used herein, the term "polyolefin layer" includes adjacent layers of crystalline polyolefins that are coextruded together.

The films of this invention wherein the polyolefin is a poly-alpha-olefin ma be monoaxially or biaxially oriented to improve their properties. Biaxial orientation may be accomplished in accordance with conventional methods, such as by blowing tubular film or by stretching cast film using a tenter frame. The oriented films may be used as heat shrinkable films to package various articles, particularly food, to provide excellent barrier to moisture, oxygen, aroma and the like.

This invention has been described with particular reference to moisture barrier, in part because it serves as a basis to determine the optimum amount of wax to add to the polyolefin layer, but addition of the wax also substantially improves other barrier properties, such as by lowering the oxygen transmission rate (OTR) and the aroma transmission rate. The wax reduces the OTR at least four fold, preferably at least ten fold, and reduces the aroma transmission rate at least two fold, preferably at least four fold.

The film of this invention is a coextruded film wherein other resins for other layers of the film. However, a polyolefin layer containing the wax (either initially or by migration) preferably forms an outer surface of the coextruded film. The film may also be laminated to a substate, such as oriented polypropylene or paper or paperboard, such as by extrusion coating or by means of an adhesive. However, to prevent migration of the wax to paper, the paper and the wax-containing polyolefin layer are preferably separated by a barrier. The barrier may be a layer of a polymer that substantially prevents migration of the wax through the barrier layer, such as a layer comprising a polyamide or an ethylene-vinyl alcohol copolymer (EVOH).

The barrier layer is preferably an interior layer in a coextruded film having a surface layer comprising a crystalline polyolefin containing wax. The barrier layer substantially prevents migration of the wax to the other surface layer of the film. For example, the other surface layer can be a heat seal layer whose heat sealability is adversely affected by the wax. Similarly, the other surface layer can be a surface printable layer whose printability is adversely affected by the wax. The barrier layer in turn may be protected by the wax-containing polyolefin layer from the adverse effects of moisture. For example, certain polymers, such as EVOH, are excellent oxygen barriers at dry conditions but are much less effective at high humidities. If the film is used to package a liquid or moist product, the wax-containing polyolefin layer would preferably form the internal surface of the package to protect the EVOH from the moisture in the product. If the film is used to package a dry product for use under humid conditions, such as in a tropical climate, the wax-containing polyolefin layer would preferably form the external surface of the package to protect the EVOH from moisture outside the package. The film may have a second wax-containing polyolefin layer, with the barrier layer being present between the two polyolefin layers. The two polyolefin layers substantially prevent moisture from adversely affecting the barrier properties of the barrier layer.

The polymer forming the barrier layer may be EVOH or a polyamide, such as nylon-6, nylon-66, amorphous nylon, or blends thereof. Coextruded films having a layer of amorphous nylon are disclosed in U.S. Pat. No. 4,800,129. The ethylene content of the EVOH is preferably between about 20 and 40 percent. Because polyamides and EVOH do not adhere well to polyolefins, the barrier layer preferably contains an adhesion promoting polymer, or more preferably, the film contains adhesive polymer layers adjacent the barrier layer. Suitable adhesive polymers for bonding a polyamide or EVOH to a polyolefin are well known in the art, being disclosed for example in U.S. Pat. No. 4,746,562 and patents referred to therein. The barrier layer preferably contains at least 50 percent, more preferably at least 80 percent, of the barrier resin.

The polyolefin layer may contain minor amounts, preferably less than ten percent, of conventional polymer additives, including colorants. However, the polyolefin layer preferably comprises at least eighty percent of crystalline polyolefin. When the polyolefin is polyethylene, the amount of wax is preferably between about 3 and 12 percent. When the polyolefin is propylene homopolymer, the amount of wax is preferably between about 2 and 7 percent. When the polyolefin is a copolymer of propylene and ethylene, the amount of wax is preferably between about 3 and 9 percent. When the polyolefin is polybutylene, the amount of wax is preferably between about 3 and 10 percent. When the polyolefin is a copolymer of butylene and ethylene, the amount of wax is preferably between about 3 and 12 percent. The polyolefin layer may comprise a blend of crystalline poly-alpha-olefins.

In the following examples WVTR was measured at 100° F. (38° C.) and 90 percent relative humidity in accordance with ASTM E96 and TAPPI Standard T464. All percentages are by weight.

COMPARATIVE EXAMPLE A AND EXAMPLES 1-3

Single layer films were prepared by extruding blends of polybutylene (PB-0110) with various amounts of a paraffin wax available commercially under the designation Chevron 143. The films were cooled immediately after extrusion by contacting them with a chill roll having a temperature of 10° C. (50° F.). The WVTR of each film was measured. The results are shown in the Table.

COMPARATIVE EXAMPLE B AND EXAMPLES 4-8

Examples A and 1-3 were repeated except polypropylene (Shell 5384) was substituted for the polybutylene and the chill roll temperature was 4° C. (39° F.). The results are shown in the Table and in FIG. 1 (curve A). In addition, the OTR of the films of Examples B, 4, 7 and 8 were measured at 72° F. (22° C.) and 45 percent relative humidity in accordance with ASTM-D3985-81. The respective values per mil of film thickness were 243, 8.2, 11.5, and 85 cc/100 square inches/24 hours. A graph of these values plotted against wax concentration would form a concave curve having a low point at or near the same wax concentration as the low point for WVTR.

COMPARATIVE EXAMPLE C AND EXAMPLES 9-15

Examples B and 4-8 were repeated except a copolymer of propylene and about five percent ethylene (Himont SD-062) was substituted for the polypropylene. The results are shown in the Table and in FIG. 1 (curve B). FIG. 1 shows that the copolymer requires more wax than the homopolymer to achieve an optimum reduction in WVTR but excellent results are obtained over a broader range of wax concentration. In other words, the meniscus of the curve is shifted to the right and is broader. This is believed to be due to the fact that the copolymer has a higher proportion of amorphous phase. In addition, the aroma transmission rate of the films of Examples C and 12 were measured using a solution of one percent amyl acetate in propylene glycol as the aromatic substance. The aroma transmission rate of the film of Example 12 was 0.34 mg/100 square inches/24 hours compared to a rate of 1.70 for the film of Example C, a five fold reduction.

EXAMPLE 16

Example 15 was repeated except the temperature of the chill roll was increased to 10° C. As shown in the Table, this increase in temperature resulted in a substantial increase in the WVTR.

EXAMPLE 17

A coextruded film having the following structure was prepared:

HPP/RCPP/AN/RCPP/HPP+wax/PB Blend where HPP is propylene homopolymer (Amoco 6B207), RCPP is random copolymer polypropylene tie layer (DuPont E-306), AN is amorphous nylon (DuPont PA3426), wax is Chevron 143 (8 percent), PB Blend is polybutylene (Shell DP1560) containing 5 percent slip/antiblock concentrate (DuPont 9619-1). The film had a thickness of 2.2 mils. The thickness ratios of the layers were 38:4:8:5:35:10. The film had a WVTR of 0.06 and an OTR of 7.5. The heat seal strength of a PB Blend to PB Blend heat seal, formed at 270° F. at 20 psi for two seconds, was six pounds per inch. This Example illustrates a film that is especially suitable as a cereal liner that has excellent barrier properties, good heat sealability, and a surface printable layer. The amorphous nylon substantially prevented the wax from migrating into the HPP surface layer to interfere with its printability.

EXAMPLE 18

A coextruded film having the following structure was prepared:

LMDPE/EMA/EVOH/EMA/HPP+wax/HPP where LMDPE is linear medium density polyethylene (Union Carbide 7038), EMA is ethylene-methyl acrylate copolymer tie layer (DuPont E-318). EVOH is ethylene-vinyl alcohol copolymer (30 percent ethylene DuPont 3007-OH), HPP+wax is propylene homopolymer (Shell 5384) containing 8 percent wax (Chevron 143), and HPP is propylene homopolymer (Amoco 10-6711). The film had a thickness of 3 mils. The thickness ratios of the layers were 14:5:9:14:54:4. The film had a WVTR of 0.08 and an OTR of 0.03. The heat seal strength of a LMDPE to LMDPE heat seal, formed at 250° F. at 20 psi for two seconds, was 4.4 pounds per inch. This Example illustrates a food packaging film that has excellent OTR as well as excellent WVTR, and good heat sealability. The EVOH layer substantially prevented the wax from migrating to the LMDPE layer to interfere with its heat sealability.

TABLE

| Example | Polyolefin | Wax | Temp. | Gauge | WVTR | WVTR/mil |
|---|---|---|---|---|---|---|
| A | PB | None | 10° C. | 1.5 | 0.62 | 0.93 |
| 1 | " | 3% | " | 1.2 | 0.06 | 0.07 |
| 2 | " | 4.5% | " | 1.5 | 0.03 | 0.05 |
| 3 | " | 6% | " | 1.3 | 0.03 | 0.04 |
| B | PP | None | 4° C. | 1.0 | 0.66 | 0.66 |
| 4 | " | 3% | " | 1.0 | 0.10 | 0.10 |
| 5 | " | 4% | " | 1.1 | 0.02 | 0.02 |
| 6 | " | 5% | " | 1.2 | 0.01 | 0.01 |
| 7 | " | 6% | " | 1.1 | 0.03 | 0.03 |
| 8 | " | 9% | " | 1.0 | 0.18 | 0.18 |
| C | coPP | None | " | 1.2 | 0.51 | 0.61 |
| 9 | " | 3% | " | 1.2 | 0.22 | 0.26 |
| 10 | " | 4% | " | 1.3 | 0.03 | 0.04 |
| 11 | " | 5% | " | 1.3 | 0.02 | 0.03 |
| 12 | " | 6% | " | 1.2 | 0.01 | 0.01 |
| 13 | " | 7% | " | 1.2 | 0.02 | 0.02 |
| 14 | " | 9% | " | 1.2 | 0.05 | 0.06 |
| 15 | " | 12% | " | 1.2 | 0.10 | 0.12 |
| 16 | " | " | 10° C. | 1.2 | 0.34 | 0.40 |

We claim:

1. A coextruded film comprising (a) a surface layer comprising a crystalline polyolefin and an amount of wax which reduces the water vapor transmission rate of the layer at least four fold, the amount of wax being between about 2 and about 12 percent based on the weight of the polyolefin, the wax being a polyethylene type wax having a molecular weight between about 300 and 800 and the polyolefin being selected from the group consisting of isotactic polypropylene, polybutylene, poly-4-methylpentene-1, copolymers of propylene with up to 7 percent ethylene by weight, copolymers of butylene with up to 5 percent ethylene by weight, and copolymers of propylene and butylene, and (b) an interior barrier layer of polymeric material that substantially prevents migration of the wax through the barrier layer.

2. The film of claim 1 wherein the barrier layer comprises a polyamide or an ethylene-vinyl alcohol copolymer.

3. The film of claim 1 wherein a layer of an adhesive polymer is present on each side of the barrier layer.

4. The film of claim 1 having a second surface layer which is a heatsealable layer and the barrier layer substantially prevents migration of the wax from the layer of crystalline polyolefin to the heatsealable layer.

5. The film of claim 1 wherein the second surface layer of the film is a surface printable layer and the barrier layer substantially prevents migration of the wax from the layer of crystalline polyolefin to the heat sealable layer.

6. The film of claim 1 having a second layer comprising a crystalline polyolefin containing an amount of wax which reduces the water vapor transmission rate of the second layer at least four fold, the amount of wax being between about 2 and about 12 percent based on the weight of the polyolefin, the wax being a polyethylene type wax having a molecular weight between about 300 and 800 and the polyolefin being selected from the group consisting of isotactic polypropylene, polybutylene, poly-4-methylpentene-1, copolymers of propylene with up to 7 percent ethylene by weight, copolymers of butylene with up to 5 percent ethylene by weight, and copolymers of propylene and butylene, the barrier layer being present between the first and second wax-containing polyolefin layers, whereby the wax-containing polyolefin layers substantially prevent moisture from adversely affecting the barrier properties of the barrier layer.

7. The film of claim 6 wherein the barrier layer comprises ethylene-vinyl alcohol copolymer.

8. The film of claim 6 wherein the wax is a paraffin wax.

9. The film of claim 1 wherein the wax reduces the water vapor transmission rate at least ten fold.

10. The film of claim 6 wherein the wax reduces the water vapor transmission rate of the second layer at least ten fold.

* * * * *